United States Patent [19]

O'Brien

[11] 3,956,071

[45] May 11, 1976

[54] ELECTRICAL HEATING APPARATUS FOR REMOVING VAPORIZABLE IMPURITIES FROM LUBRICATING OIL

[76] Inventor: Edward M. O'Brien, 1717 E. St. Louis Ave., Las Vegas, Nev. 89105

[22] Filed: Aug. 19, 1974

[21] Appl. No.: 498,441

[52] U.S. Cl. ............................ 196/46; 123/196 AB; 184/6.24; 196/46.1; 210/180
[51] Int. Cl.² ..................... C10C 1/20; C10G 31/02; F01M 1/10
[58] Field of Search................... 196/46, 46.1, 121; 210/180, 168, 181, 223; 202/208, 234; 159/DIG. 1; 123/196 AB, 34, 122 E, 122 F; 208/179, 184; 184/6.24

[56] References Cited

UNITED STATES PATENTS

| | | | |
|---|---|---|---|
| 1,490,325 | 4/1924 | Johnson | 196/121 X |
| 2,219,101 | 10/1940 | Finwall | 196/46.1 |
| 3,480,145 | 11/1969 | Gladden | 210/223 |
| 3,499,428 | 3/1970 | Stirling | 208/184 |
| 3,616,885 | 11/1971 | Priest | 210/180 X |
| 3,859,975 | 1/1975 | Hines | 184/6.24 X |

Primary Examiner—Morris O. Wolk
Assistant Examiner—Michael S. Marcus
Attorney, Agent, or Firm—Harris, Kern, Wallen & Tinsley

[57] ABSTRACT

An apparatus for removing vaporizable impurities from lubricating oil, or the like, including: a housing; an oil inlet fitting adjacent the top of and communicating with the housing, such fitting having a downwardly directed, intermediate inlet port, laterally and downwardly directed side inlet ports on opposite sides of the intermediate port, and an external groove interconnecting the side and intermediate ports; an electrical heating element below the intermediate port and having the form of a conical spiral with its larger end uppermost; and a ball in and supported by the upper end of the conical spiral in a position to have impinge thereon oil discharged by at least the intermediate port. The ball serves to distribute the oil impinging thereon uniformly over the inverted conical spiral. When the oil is cold, the external groove interconnecting the ports conducts virtually all of the oil onto the ball for distribution over the inverted conical spiral heating element. When the oil is hot, only the oil discharged by the intermediate port impinges on the ball for distribution over the heating element, the oil discharged by the side ports impinging on the side wall of the housing for cooling.

1 Claim, 4 Drawing Figures

U.S. Patent    May 11, 1976    3,956,071
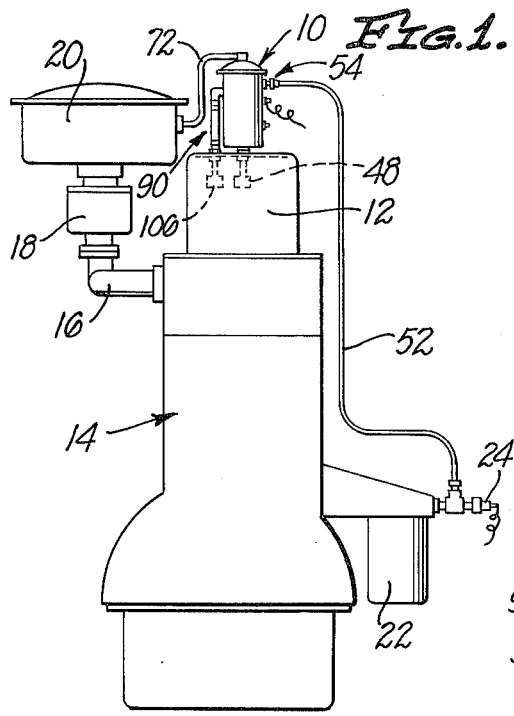
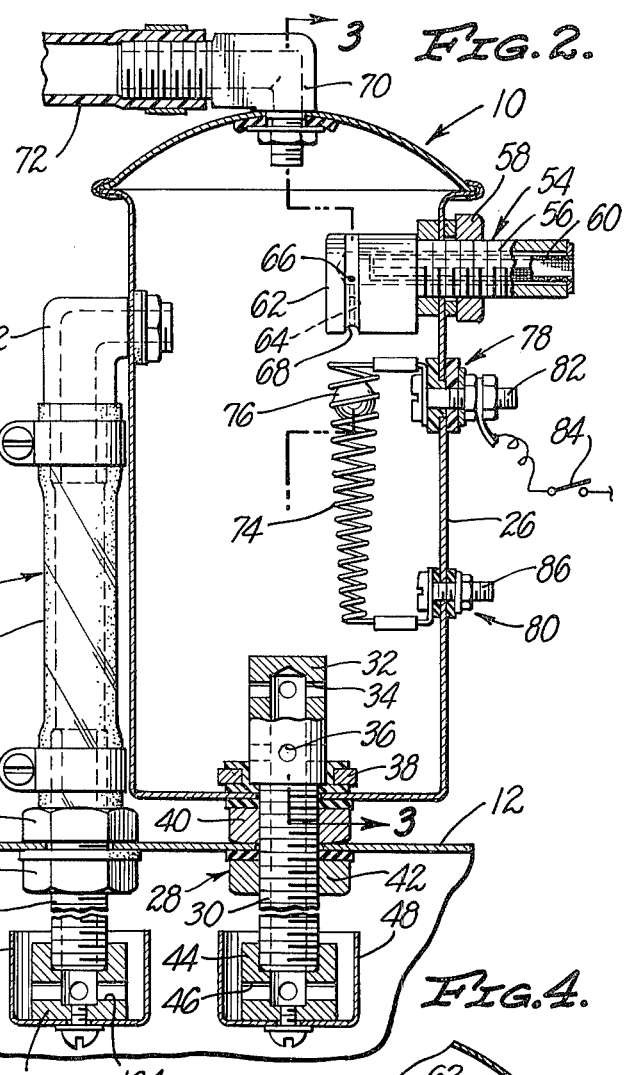
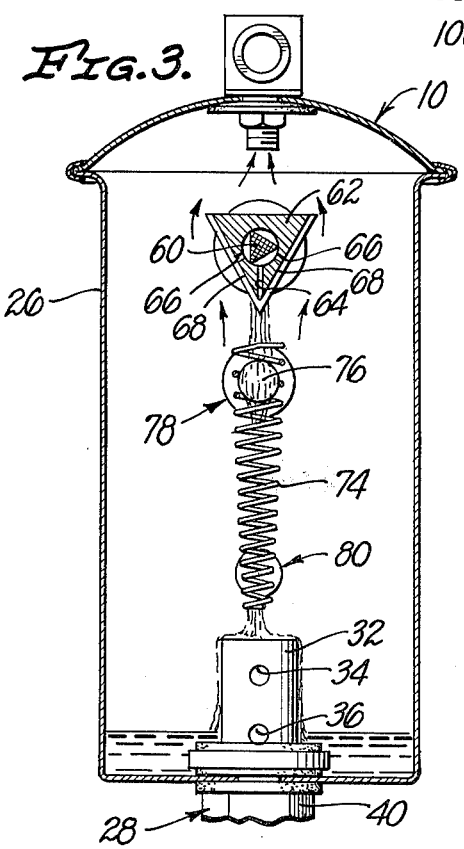
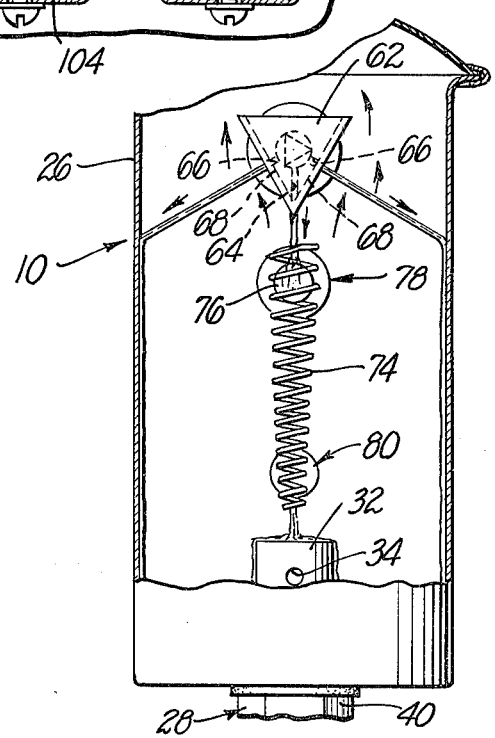

ELECTRICAL HEATING APPARATUS FOR REMOVING VAPORIZABLE IMPURITIES FROM LUBRICATING OIL

BACKGROUND OF INVENTION

The present invention relates in general to an electrical heating apparatus for removing vaporizable impurities from lubricating oil and, more particularly, to a unit of this type which is generally similar to that shown in U.S. Pat. No. 2,219,101, granted Oct. 22, 1940 to Nelson J. Finwall. The vaporizing unit of the Finwall patent has disadvantages which the present invention overcomes.

More particularly, the lubricating oil to be heated by the element 41 of Finwall is intended to be deposited thereon by the conduit 51, which terminates directly above the heating element. However, I have found that, in actual practice, the conduit 51 deposits the lubricating oil on the smaller upper end of the conical spiral heating element 41 throughout only a narrow range of operating temperatures. More particularly, when the lubricating oil is cold, it tends to flow to the left under the discharge end of the conduit 51 and dribbles downwardly onto only a part of the heating element 41, or misses it completely. On the other hand, when the oil is hot, it partially or completely overshoots the heating element. Thus, the lubricating oil is properly delivered to the heating element throughout only a narrow intermediate temperature range. Even under such conditions, distribution of the lubricating oil over the heating element is not uniform.

Because of the foregoing situation, one of the disadvantages of the Finwall unit is that the desired function of eliminating vaporizable impurities, such as water, gasoline, acids, and the like, is not carried out efficiently. Another disadvantage is that since there are numerous occasions wherein the heating element 41 is not completely wetted with the lubricating oil, carbonization of the lubricating oil frequently occurs over all or parts of the element, resulting in the formation of undesirable deposits which interfere with proper operation of the heating element, and which ultimately must be filtered out of the oil.

OBJECTS AND ADVANTAGES OF INVENTION

With the foregoing background in mind, the primary object of the present invention is to provide an impurity vaporizing unit which overcomes the foregoing and various other disadvantages of that disclosed in the Finwall patent mentioned.

More particularly, a basic object of the invention is to provide a unit wherein the lubricating oil is uniformly distributed over the electrical heating element at all times, irrespective of the temperature of the oil, thereby avoiding disadvantages of the prior art of the nature hereinbefore discussed.

Still more particularly, an important object of the invention is to provide an oil inlet fitting adjacent the top of and communicating with the housing and having means for directing at least part of the lubricating oil downwardly onto the heating element at all times, irrespective of the oil temperature.

Still more specifically, an important object is to provide the oil inlet fitting with a downwardly directed, intermediate inlet port above the electrical heating element, and laterally and downwardly directed side inlet ports on opposite sides of the intermediate port, and to further provide the inlet fitting with an external groove connecting the intermediate port to the side ports. With this construction, when the oil is cold, the oil from the side ports runs downwardly through the groove mentioned to the intermediate port at the bottom of the inlet fitting, and all of the oil then drains downwardly onto the heating element. When the oil is hot, on the other hand, a jet of oil from the intermediate port is directed downwardly onto the electrical heating element, and jets of oil from the side ports are directed downwardly and laterally against the side wall of the housing of the unit to avoid heating this portion of the oil and to obtain some cooling of such portion thereof.

Still another important object is to provide a heating element having the form of a conical spiral positioned below the intermediate port with the larger end of the conical spiral uppermost, and to provide a ball in and supported by the upper end of the conical spiral in a position to have impinge thereon the oil discharged by at least the intermediate port. The latter occurs when the oil is hot. When the oil is cold, all of the oil discharged by the intermediate port and both of the side ports drains downwardly onto the ball supported by the inverted conical spiral. This ball functions to distribute the oil inpinging or draining thereon evenly over the entire circumference of the upper end of the inverted conical spiral, the oil thereafter draining downwardly and wetting all of the progressively smaller convolutions therebelow. Consequently, the entire heating element is wetted with oil at all times to avoid dry areas tending to produce carbonization.

Yet another object of the invention is to provide an outlet fitting at the bottom of the housing having outlet ports above the bottom thereof, and to provide a magnet in the bottom of the housing to collect and retain metallic particles in the lubricating oil.

The foregoing objects, advantages, features and results of the present invention, together with various other objects, advantages, features and results thereof which will be evident to those skilled in the lubricating oil purifying art, may be achieved with the exemplary embodiment of the invention illustrated in the accompanying drawing and described in detail hereinafter.

DESCRIPTION OF DRAWING

FIG. 1 is an end elevation of an engine illustrating the lubricating oil purifying unit of the invention installed thereon;

FIG. 2 is a vertical sectional view through the lubricating oil purifying unit of the invention;

FIG. 3 is another vertical sectional view of the lubricating oil purifying unit, taken in a plane at right angles to the plane of FIG. 2, and showing the operation of the unit when the lubricating oil is cold; and FIG. 4 is a view similar to FIG. 3, but showing the operation of the unit when the oil is hot.

DESCRIPTION OF EXEMPLARY EMBODIMENT OF INVENTION

Referring initially to FIG. 1 of the drawing, the impurity vaporizing apparatus or unit of the invention is designated generally therein by the numeral 10, and, as a matter of convenience, is shown mounted on the rocker box 12 of a valve-in-head in-line internal combustion engine 14. The latter is provided with the usual intake manifold 16, carburetor 18 and air filter housing 20, and also with the usual oil filter 22 and oil pressure light connection 24 (or oil pressure gauge connection). It will be understood, of course, that the impurity vaporizing unit 10 of the invention may be utilized on other types of internal combustion engines, or even in other environments.

The impurity vaporizing unit 10, as shown in FIGS. 2 to 4 comprises a generally upright housing 26, which may be cylindrical as shown. In the particular construction illustrated, the housing 26 is mounted vertically on top of the rocker box 12 by means of an outlet assembly 28 which connects the lower end of the housing to the interior of the rocker box.

More particularly, the outlet assembly 28 includes a depending outlet tube 30 having at its upper end a head 32 within the housing 26 and provided with upper and lower outlet ports 34 and 36 communicating with the interior of the outlet tube. A magnetic washer 38 may encircle the outlet tube 30 at the bottom of the housing 26 to collect magnetizable metallic particles.

The outlet tube 30 is secured to the bottom wall of the housing 26 by clamping such bottom wall between the head 32 on the outlet tube and a nut 40 threaded on the outlet tube. The outlet tube 30 extends downwardly through the top wall of the rocker box 12, the impurity vaporizer unit 10 being clamped to such top wall by a lower nut 42 within the rocker box. As will be apparent, the top of the rocker box 12 is clamped between the nuts 40 and 42. Suitable gaskets, not specifically identified, are provided to furnish oil tight seals.

As shown in FIG. 2, the outlet tube 30 terminates at its lower end, within the rocker box 12, in an outlet fitting 44 having outlet ports 46, the outlet fitting 44 also carrying a cup-like sump 48 which extends above the outlet ports 46. With this construction, the outlet ports 46 are always submerged in oil being returned to the rocker box 12 from the impurity vaporizing unit 10, thereby precluding any blow by into the unit 10.

An oil line 52 connects the outlet side of the oil filter 22 to an inlet assembly 54 communicating with the interior of the housing 26 of the impurity vaporizing unit 10 adjacent the top of such housing. The inlet assembly 54 includes an inlet fitting 56 extending into the housing 26 through the side wall thereof and clamped in place by a nut 58. A screen 60 within the inlet fitting 56 traps any particulate matter which may pass through the oil filter 22.

The oil inlet fitting 56 terminates at its inner end, and within the housing 26, in an oil discharge head 62 which may be triangular, as shown. This discharge head is provided with a downwardly directed, intermediate inlet port 64 and two laterally and downwardly directed, side inlet ports 66 respectively located on opposite sides of the intermediate port 64. External grooves 68 in the discharge head 62 connect the discharge ends of the side inlet ports 66 to the discharge end of the intermediate inlet port 64. The significance of this arrangement will be discussed in more detail hereinafter.

At the top of the housing 26, and suitably secured thereto, is a vent fitting 70 which may simply vent vapors generated by the impurity vaporizing unit 10 into the atmosphere. In areas where pollution restrictions do not permit this, the vent fitting 70 may be connected by a line 72 to the air intake system of the engine 14. Preferably, to avoid developing more than a small vacuum in the housing 26, the line 72 is connected to a point of relatively low vacuum, such as the air filter housing 20.

Directly below the intermediate inlet port 64 is an electrical heating element 74 having the form of a conical spiral disposed with its axis vertical and positioned with the larger end of the conical spiral uppermost. A ball 76 of an electrically nonconductive material is seated in and supported by the upper end of the conical spiral forming the heating element 74. The conical spiral 74 is mounted on the side wall of the housing 26 by upper and lower mounting assemblies 78 and 80 the structures of which will be clear from FIG. 2 of the drawing and which thus need not be described in detail. The upper mounting assembly 78 includes a bolt 82 electrically connected to the upper end of the conical spiral 74 and electrically connected to the electrical system of the automobile in which the engine 14 is installed through the ignition switch 84 of the automobile. Thus, the unit 10 is always "on" as long as the engine 14 is running. The lower mounting assembly 80 for the conical spiral 74 includes a bolt 86 electrically connected to the lower end of the conical spiral and electrically grounded to the housing 26 to complete the electrical circuit through the conical spiral when the ignition switch 84 is closed.

An overflow 90 is provided which functions only in the unlikely event that the outlet assembly 28 at the bottom of the housing 26 becomes obstructed.

This overflow comprises an elbow 92 mounted on the housing 26 and communicating with such housing adjacent the top thereof. Connected to and depending from the elbow 92 is a transparent tube 94. If this tube contains oil, which can be determined readily from visual inspection, clogging of the normal outlet assembly 28 is indicated.

The lower end of the transparent tube 94 is connected to the upper end of an outlet tube 96 similar to the outlet tube 30 and extending downwardly through the rocker box 12 in the same manner. The outlet tube is clamped to the rocker box 12 by nuts 98 and 100 similar to the nuts 40 and 42.

At the lower end of the outlet tube 96, within the rocker box 12, is an outlet fitting 102 similar to the outlet fitting 44 and having similar ports 104. The fitting 102 carries a sump 106 similar to the sump 48 and performing a similar function.

OPERATION OF IMPURITY VAPORIZING UNIT 10

An important feature of the invention is that the conical-spiral electrical heating element 74 is always wetted with the lubricating oil used in the engine 14, while the engine is in operation, because of the fact that the conical spiral is oriented with its larger end uppermost, and because of the presence of the ball 76. The manner in which this is accomplished will be explained in the discussion which follows.

Referring to FIG. 3 of the drawing, when the lubricating oil is cold, the oil discharged by the side inlet ports 66 flows downwardly along the grooves 68 and joins the oil discharged by the intermediate inlet port 64, this being due, of course, to the higher viscosities of the oil at lower temperatures. Thus, virtually all of the oil comes into contact with the electrical heating element 74, being spread substantially uniformly thereover by the ball 76 and by the downward convergence of the element. Thus, at low oil temperatures, maximum vaporization of vaporizable impurities is achieved, which is an important feature of the invention.

Referring to FIG. 4, when the lubricating oil is hot, the oil discharged by the side inlet ports 66 impinges on the side wall of the housing 26, to achieve some cooling of the oil. Under this condition, only the oil discharged by the intermediate inlet port 64 comes into contact with the electrical heating element 74, again being spread substantially uniformly thereover by the ball 76 and the downward convergence of the heating element.

Thus, with the particular triple-jet arrangement achieved by the combination of the intermediate and side inlet ports 64 and 66 shown, the electrical heating element 74 is substantially completely wetted with the lubricating oil at all times to achieve efficient elimination of vaporizable impurities through the vent 70 under all conditions, and to minimize carbonization of the lubricating oil by the electrical heating element, which are important features. As previously explained, the sumps 48 and 106, by keeping the oil levels therein above the discharge ports 46 and 104, eliminate any blow by into the impurity vaporizing unit 10.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. In an apparatus for removing vaporizable impurities from lubricating oil the combination of:
 a. a housing having a top and a bottom;
 b. oil inlet fitting means connected to and communicating with the interior of said housing in a location closer to the top of said housing than the bottom thereof;
 c. said inlet fitting means having a downwardly directed, intermediate inlet port, and laterally and downwardly directed side inlet ports on opposite sides of said intermediate port, said ports located within the interior of said housing;
 d. said inlet fitting means having an external groove interconnecting said side and intermediate ports;
 e. an electrical heating element mounted in said housing below said intermediate port;
 f. said heating element having the form of a conical spiral positioned below said intermediate port with the larger end of said conical spiral uppermost;
 g. a ball seated in and supported by the upper end of said conical spiral in a position to have impinged thereon oil discharged by at least said intermediate port;
 h. a vent for vaporized impurities connected to and communicating with the interior of said housing in a location at the top thereof; and
 i. oil outlet fitting means connected to and communicating with the interior of said housing at a location closer to the bottom of said housing than the top thereof, and below said inlet fitting means, said conical spiral, and said ball.

\* \* \* \* \*